United States Patent Office 3,062,655
Patented Nov. 6, 1962

3,062,655
WATER INSOLUBLE DEFIBRILLATED MEAT PROTEIN
Joachim W. Staackmann, Tinley Park, and Henry P. Furgal, Highland Park, Ill., assignors, by mesne assignments, to Armour and Company, Chicago, Ill., a corporation of Delaware
No Drawing. Filed Apr. 5, 1960, Ser. No. 20,024
18 Claims. (Cl. 99—14)

This invention relates to water extracted bland meat protein which is defibrillated and substantially colorless and flavorless, to a method for preparing it, and to food combinations containing the bland meat protein.

Meat, referring to the flesh of animals and fowl, has flavor and texture which make it among the most desirable of all foods. Consumers of meat, however, do not place equal value on all types of meat. Certain grades and parts, or "cuts," of meat sell at a premium while others can be disposed of only with difficulty, and the price differential between the different grades and cuts is not explained on the basis of differences in nutritional values. Familiarity of consumers with certain cuts of meat, tenderness of the meat, ease of preparation and so on, make some types of meat worth more in the market place than other kinds. There is, in effect, a surplus of many nutritionally desirable but marketably undesirable cuts of meats.

Although meat in itself generally has very desirable flavor and texture, meat characteristics are not desirable in all types of foods. Few people crave beef flavored ice cream or mutton flavored cake. Likewise, a food such as bread having a texture reminiscent of beef shank meat would be scorned. Therefore a method of utilizing less desirable types of meats in foods which are traditionally unrelated to meat is of economic and nutritional importance. Nutritional improvement of many foods which are protein deficient, or contain lower quality protein, may be accomplished by incorporating meat protein into these foods. Incorporation of meat into protein deficient foods has heretofore been hampered by the undesirably atypical flavor, texture and appearance which usually results from the blending of most non-meat foods with meats.

A method for preparing foods fortified with meat, provided the resulting foods are esthetically pleasing to consumers, offers a means for giving consumers better foods. It also offers the livestock industry a profitable means for disposing of the less desired types of meats. Accordingly, we have invented a novel and useful method for modifying meat to thereby form versatile protein products that are as nutritious as whole meat protein but do not have typical meat characters which tend to limit meat usage. This modification process renders meat susceptible to use in a variety of foods normally unrelated to meat.

It is therefore a primary object of this invention to provide meat protein products which are as nutritious as whole meat protein and which are bland in flavor, essentially colorless, soft textured, and more versatile than native meat protein. Another object is to provide a method for imparting more broadly useful flavor, color and texture characteristics to meat protein without harming the nutritional quality of the meat protein. And a further object is to provide a method for combining the meats of two or more species of animals into products which retain only the flavor and texture characteristics of one selected species, that one species being marketably more desirable to meat consumers. A still further object is to provide food materials having combined sources of proteins which are prepared so as to possess a variety of desired flavors and textures, and which in the combined form are nutritionally superior to the individual uncombined proteins. This invention provides as one of its advantages a simple method for utilizing less desirable meat products in an economically and nutritionally advantageous manner. Other advantages and objects of this invention will become apparent as the specification continues.

This invention rests on the discovery that meat first rendered substantially tasteless and colorless by water extraction can be alkali treated in a manner which softens and ruptures the small threadlike fibrils without degrading the resulting insoluble protein. Rupture and softening of the meat fibrils, defibrillation, yields a meat preparation which has no typical meat texture and is susceptible to many subsequent operations, such as spray drying, wherein fibrils cause interference. These fibrils, which give meat its typical fibrous texture can not be effectively ruptured by use of heat or ordinary mechanical processing.

In the main aspect of this invention, comminuted meat is washed with water to extract water soluble components. Separation, as by centrifugation, serves to remove this added water along with fat insoluble meat components. After washing, the water insoluble meat proteins are adjusted to an alkaline pH. Sufficient heat and/or time, proportional to the pH level employed, is applied to aid defibrillation. But the heat and time interval is not drastic enough or of such duration as to cause protein hydrolysis with its resulting disadvantages. After defibrillation the product of this invention may be stabilized as by drying, freezing, or further heating.

The resulting product, which is essentially tasteless, colorless, and non-fibrous, and which contains substantially all the water insoluble proteins of meat, may be advantageously added to most types of foods. Such foods fortified with bland and soft textured meat protein retain their usual flavor and texture properties but are nutritionally improved.

All types of meats may be used for raw material for the practice of this invention. Muscle meats are preferably used in that some animal organs possess marked flavors and odors which are more difficult to remove by water extraction. Meats from all species of animals and fowl may be satisfactorily employed.

The first step in the process of this invention is the preparation of finely divided raw meat particles. Any common method of comminution may be used. Preferably, ground meat mixed with water is blended by means of equipment such as a Mincemaster, silent cutter, or a sausage mill. The finely divided meat slurry is then mechanically separated as by centrifugation. The resulting supernatant contains fat and the soluble flavor components of the meat. Preferably the washing and blending steps are repeated to ensure that the meat is substantially free of color and flavor.

After washing, the water insoluble meat protein is mixed with fresh water and adjusted to pH 8.0 or thereabove. This alkaline treatment of the washed meat causes swelling and softening of the meat fibrils. Any alkaline level in excess of pH 8.0 is operable. However, we prefer to use a range of about pH 8.0 to 12.0. Although strongly alkaline conditions, as those above pH 12.0, may be used, upper levels require careful control of time and temperature conditions to avoid protein hydrolysis.

Although other alkalies may be used, we prefer to use ammonium hydroxide for alkaline treatment of the water washed meat. $NH_4OH$ is the alkali of choice due to its volatility. After or during the softening and rupturing treatment, the softened protein will usually be subjected to heat treatment, and during this heat treatment the $NH_4OH$ because of its volatility is largely evaporated from the defibrillated product. Therefore there is little likelihood that the alkalizing agent will contribute flavor to the finished product. However, other reagents such as complex phosphates may be satisfactorily used in this proces. If it is deemed desirable to employ high alkalinities, as those in excess of about pH 10.0, and complex phosphates are initially employed, another type or secondary alkalizing agent such as sodium bicarbonate, sodium hydroxide or ammonium hydroxide is preferably used to prevent formation of "soapy" flavors created by the use of high levels of some complex phosphates.

While the washed protein is maintained at a pH of from 8.0 to 14.0, it is subjected to heat treatment and/or a holding period sufficient to soften and rupture the meat fibrils.

It is preferable to use a temperature of from about 140° F. to 212° F. when the water extracted meat protein is from pH 8.0 to 10.0. However when facilities for very rapid continuous heating are available, as steam injection flash-heaters, temperatures in the vicinity of 300° F. may be used. When these high temperatures are used the heating period will be instantaneous. If very high alkaline pH's are used, temperatures much lower than 140° F. can be satisfactorily employed for defibrillation. It should be stressed that alkali treatment conditions—pH, time, and temperature—must not be great enough to produce hydrolysis of the protein. Defibrillation is a function of the degree of alkalinity, time, and temperature: when higher pH levels are used, lower temperatures and shorter times sufficient when lower temperatures are used, longer times are required for softening and defibrillation. Thus at pH 8.0 to 10.0, and at temperatures from 212° F. to 300° F. defibrillation is accomplished in a few seconds. At a pH of 8.0 to about 10.0, and at a temperature of 140° F. a time interval of about 10 minutes is required for defibrillation.

Preferably the softened protein is again comminuted after the alkali defibrillation, but with proper alakli treatment a second comminution is not essential. Comminution may be desirable in that the softened fibrils, some of which might have escaped rupture during the alkali treatment, are easily broken apart by ordinary mechanical methods after this treatment.

After defibrillation, the meat protein should be stabilized if it is not to be consumed soon thereafter. Stabilization includes any of the common methods of food preservation such as heating, freezing and dehydration. The preferred method of stabilization is dehydration which may be accomplished by spray drying. Alkaline processing destroys fibrils which make spray drying of ordinary meat preparations impractical due to the tendency of the intact threadlike fibrils to clog minute orifices of spray nozzles and cores. Thus, the alkaline treatment has the added advantage of facilitating subsequent drying operations.

After it has been stabilized the bland meat product of this invention may be incorporated into many types of food products to enhance their protein value, but without altering their typical flavor and texture characteristics. Meat preparations, grain and cereal products, dairy products, candies and other confections, fruit drinks and juices, sauces, soups, gravies and prepared vegetables are some of the foods which may be advantageously fortified. In addition, special dietetic foods such as hypo-allergenic preparations, infant formulas and geriatric foods may be especially improved by fortification with water extracted fiberless meat protein.

This invention provides a method for modifying meat from one species of animal so that it may be incorporated into meats from other species; beef protein may be added to pork, and mutton may be added to beef. Thus, meat protein from a species having lower consumer acceptance may be blended with that of a second and more desirable species without altering the desirable qualities of the second species.

Flavors other than that of the original meat may be added to the bland meat protein preparations. Some of the added flavors which may be advantageously added to the protein preparation include: fruits, chocolate, vegetables, spices, protein hydrolysates, yeast autolysates, sugar and other sweeteners, meat flavors, and the like.

Having generally described our invention the following specific examples will serve to further illustrate it.

*Example I*

600 lbs. of beef chucks were ground and mixed with 1200 lbs. of water. The ground meat and water were blended using a Mincemaster. The 1800 lbs. of blend was then pumped into a solid bowl centrifuge which had been filled with cold water. After centrifugation, the supernatant containing fat and soluble flavor components was removed, 530 lbs. of residue remaining in the centrifuge was mixed with 1200 lbs. of water. The diluted residue after mixing was again centrifuged. The supernatant of both runs was collected for beef extract manufacture. The residue mixed with water was alkalized with 28% $NH_4OH$ to a pH of slightly above 8.0. At this point the mixture became very viscous. The alkaline mixture was then reblended by mincing. The prepared blend was cooked by means of a flash cooker at 212° F., remixed and cooled to 90° F. After cooling it was packed into 100 lb. molds and frozen. The finished product was white, smooth and tasteless. At 212° F. the product was very fluid; at 100° F. it was slightly viscous.

Upon analysis this high moisture protein product had the following analysis: moisture 95.3%, protein 4.13%, fat 0.3%, ash 0.07%.

*Example II*

Bland and defibrillated meat protein prepared as in Example I was spray dried to a smooth soft powder. A rat feeding study was performed to biologically evaluate the protein quality of the bland meat powder. The method of Bender and Doall, Brit. J. Nutrition 11:140–149 (1957) was used to compare the nutritive value of these protein preparations. This method which results in a value termed protein retention efficiency, briefly consists of feeding a group of rats on a diet containing 10% of the test protein, and a group of litter-mates on a non-protein diet. After 10 days' feeding the algebraic difference between the gains in weight of the two groups, divided by the weight of the protein eaten, is defined to be the new protein ratio. This ratio multiplied by 16 is called the protein retention efficiency.

Diets were formulated to be isocaloric and to supply 10% protein from the various materials being tested. Five weanling male rats were randomly assigned to each dietary treatment. They were individually housed in raised wire cages, and food and water offered ad libitum throughout the 10 day period. Food consumption was recorded daily, and body weight recorded at the beginning and completion of the trial. The results are shown in the following table:

| Material | Number of animals | Average initial body weight | Average final body weight | Avg. total food consumed per animal | Protein retention efficiency |
|---|---|---|---|---|---|
| Protein free control | 5 | 62 | 51 | 45 | |
| Bland meat protein | 5 | 62 | 110 | 121 | 78.0 |
| Whole meat protein | 5 | 62 | 105 | 121 | 71.4 |
| Cottonseed protein | 5 | 62 | 78 | 99 | 43.5 |
| ½ bland protein ½ cottonseed meal wheat gluten | 5 | 62 | 101 | 114 | 70.2 |
| | 5 | 62 | 66 | 81 | 31.5 |
| ½ bland protein | 5 | 60 | 105 | 119 | 75.2 |
| ½ wheat gluten lactalbumin (standard) | 5 | 62 | 95 | 97 | 72.5 |

A greater protein retention efficiency indicates a higher protein quality. Thus, bland meat protein is higher quality protein than whole meat protein.

A synergistic upgrading of cottonseed protein and wheat gluten quality resulted from the blending of these protein with a 50% level of total water-insoluble meat protein.

Therefore the process of this invention while imparting new, unobvious and desirable properties to meat protein enhances the nutritional quality of meat protein.

The addition of water extracted and alkali defibrillated meat protein to selected food material, such as cottonseed protein and wheat gluten, causes a remarkable improvement in protein nutritional quality.

*Example III*

Water extracted and alkali defibrillated meat protein in wet form, 80% moisture, was incorporated in vanilla ice cream mix. The basic ice cream mix formula was as follows:

| | Percent |
|---|---|
| Cream (36% fat) | 32.5 |
| Bland meat protein (80% moisture) | 27.3 |
| Water | 21. |
| Cane sugar | 13.3 |
| Non-fat dry milk | 5.5 |
| Gelatin | 0.3 |
| Emulsifier | 0.1 |
| | 100 |

After all ingredients were blended, the mix was pasteurized at a temperature of 150° F. for 30 minutes. After over-night cooling to 35° F., vanilla extract was added just prior to freezing. The flavored mix was frozen in a commercial batch freezer to 90% overrun. After the frozen product was hardened at 0° F. it was compared with standard ice cream made according to the above formulation but with non-fat dry milk replacing the bland meat protein to adjust the standard mix to a protein level comparable to that of the meat protein mix. Taste panelists showed no preference for either the control or the meat protein ice cream. Water washed and alkali defibrillated bland meat protein may successfully be added to a standard commercial ice cream mix.

*Example IV*

Water washed and alkali defibrillated bland meat protein spray dried powder was used in the formulation of a typical graham cracker crust such as that used in cream pies. The formula of the crust was as follows:

100 gm. graham cracker crumbs
26 gm. bland meat protein powder (76% protein)
36 gm. sugar
74 gm. melted butter All dry ingredients were blended. The melted butter was blended into the dry ingredients, and mix pressed into the bottom and sides of the pie pan. Baking for 8 minutes at 350° F. resulted in a typical graham cracker crust which could not be distinguished from a typical composition crust. Calculated protein content of this crust was 11.6% protein.

*Example V*

Bland defibrillated meat protein powder, spray dried, may be successfully used as an enrichment for wheat flour and baked products. A whole wheat apple sauce cake incorporating the following ingredients was baked:

96 gms. can sugar
50 gms. shortening
50 gms. whole wheat flour
60 gms. raisins
20 gms. bland meat protein powder (76% protein)
20 gms. vital wheat gluten
30 gms. water
¼ tsp. salt
½ tsp. baking soda
½ tsp. baking powder
½ tsp. cinnamon
¼ tsp. cloves
125 gms. apple sauce Cream the shortening and sugar. Sift the remaining dry ingredients together and add to the cream mixture alternately with apple sauce and water. Add raisins. Divide into 10 muffin cups. Bake at 350° F. for 20 to 25 minutes. Typical moist apple sauce muffins containing 11.1% protein result from the preparation of this recipe.

*Example VI*

Butterscotch refrigerator cookies which were protein enriched were prepared from the following formula:

125 grams. light brown sugar.
42 gms. water.
50 gms. vital wheat gluten.
25 gms. shortening.
25 gms. butter.
25 gms. bland meat protein powder (76% protein).
25 gms. deflavored soy protein.
8.3 gms. dried whole egg.
¼ tsp. salt.
¼ tsp. baking powder.
¼ tsp. cream of tartar.
½ tsp. vanilla extract.

Cream the shortenings and sugar. Sift dry ingredients together. Add to the creamed mixture alternately with water and beat until thoroughly blended. Place dough in wax paper and form into a roll. Chill thoroughly or freeze. Slice as thin as possible and place on ungreased baking sheet. Bake until light brown, approximately 10 minutes at 375° F. The cookies made by this procedure contained 28.6% protein.

*Example VII*

Protein enriched candy may be prepared by using defibrillated bland meat protein. A formula for chocolate coconut balls follows:

90 gm. semi-sweet chocolate bits.
63 gm. evaporated milk.
30 gm. bland meat protein powder (76% protein).
17 gm. hot water.
6 gm. butter.
1 drop oil of peppermint.
Flake coconut coating.

Melt chocolate and pan over hot water. Add butter. Gradually stir in milk. Add flavoring. Mix coconut and bland meat protein together. Stir into chocolate mixture and mix well. Add hot water. Form into small balls and roll in coconut. The resulting confection has a calculated content of 11.5% protein.

While in the foregoing specification various embodiments of this invention have been described in considerable detail for the purposes of illustration, it will be apparent to those skilled in the art that this invention is susceptible to other embodiments and that many of these details can be varied widely without departing from the basic concept and spirit of the invention.

We claim:

1. The process of preparing water insoluble meat proteins including the step of alkali defibrillation after water extraction of meat said alkali treatment defibrillating the meat without degradation of the protein.

2. The process of preparing water insoluble meat protein comprising the steps of comminuting meat, water extracting the comminuted meat, and exposing the water extracted meat to alkaline pHs to destroy meat fibrils without degradation of the protein.

3. The process of preparing dried meat protein including the steps of comminuting meat, water washing the comminuted meat, mechanically separating the water soluble meat components contained within said comminuted meat from said comminuted meat, adjusting pH of the washed meat to a point within the range of 8.0 to 14, maintaining the alkaline meat at a temperature sufficient to promote softening of meat fibrils without degradation of the protein, and drying the resulting product.

4. The process for preparing dried meat protein comprising the steps of comminuting meat, repeatedly water washing the comminuted meat, separating the added water from said comminuted meat, adjusting the alkalinity of the washed meat to about pH 8.0 to 10.0, heating said meat to a temperature of from 140 to 300° F., without degradation of the protein, and drying said meat to thereby prepare a soft and wettable protein powder.

5. The process of defibrillating meat comprising the steps of water extracting the soluble fractions from meat, maintaining the water extracted meat at a pH of at least 8.0, and defibrillating the alkaline meat at a temperature of from 35° F. to 300° F. without degradation of the protein.

6. The process of preparing a meat product comprising the steps of obtaining meat from one species of animal, comminuting the meat, water extracting the comminuted meat, adjusting the pH of meat to a point within the range of 8.0 to 14.0, maintaining the meat at said point at a temperature sufficient to promote softening of meat fibrils without degradation of the protein, and incorporating the meat in an animal product essentially consisting of meat derived from a second species to thereby give a mixed animal protein product.

7. The process of preparing meat products from meats of various species, the mixed product having the characteristics of one species, comprising the steps of obtaining meat from at least one species of animal, comminuting the meat, water extracting substantially all flavor and color from the meat, adjusting the alkalinity of the water extracted meat to about pH 8.0 to 14.0, heating said meat to a temperature of at least 140° F., without degradation of the proteins and incorporating the meat into a second native product derived from a second species.

8. A comminuted meat protein product having essentially all the nutritional value of native meat protein, susceptible to ready incorporation into other foods, substantially colorless and flavorless, having a texture soft and smooth to the tongue, comprising undegraded defibrillated water insoluble meat protein.

9. A comminuted meat protein product having essentially all the nutritional value of native meat protein, susceptible to ready incorporation in other food materials, substantially colorless, odorless and flavorless, and having the texture of a soft, smooth and free-flowing powder, comprising substantially anhydrous undegraded defibrillated water-insoluble meat protein.

10. A fortified food material comprising a cereal product as a major ingredient, and substantially bland flavored, soft and smooth textured, undegraded defibrillated water insoluble complete meat protein as a minor ingredient.

11. A food composition comprising a confection as a major ingredient in combination with undegraded defibrillated water insoluble complete meat protein.

12. A fortified food composition comprising a dairy product as a major ingredient, and the essentially colorless and flavorless undegraded defibrillated water-insoluble complete proteins of meat as a minor component.

13. A special fortified dietetic composition comprising a food material selected from the class consisting of hypoallergenic foods, infant formulas and geriatric preparations, and the water-insoluble undegraded defibrillated complete proteins of meat.

14. A fortified meat composition comprising a meat product as a major component, and the bland water insoluble and undegraded defibrillated complete proteins of meat as a minor component.

15. A food product comprising wheat gluten and undegraded defibrillated water extracted complete meat protein, said proteins comprising up to about 50% of the food product.

16. A food product which comprises wheat gluten and undegraded defibrillated water extracted complete meat proteins, the product consisting of up to about 50% of said meat proteins.

17. The process of enhancing the protein quality of a food material while retaining the traditional and typical flavor, texture and appearance of said food material comprising the steps of extracting the water soluble components from meat, alkali defibrillating the water insoluble portions of the meat, and incorporating the complete insoluble and undegraded defibrillated meat into said food material.

18. A process for enhancing the protein quality of a food material while retaining the typical flavor, texture and appearance of said food material comprising the steps of water extracting the soluble components from meat, alkali defibrillating the complete water insoluble portions of the meat, drying the undegraded defibrillated meat to thereby produce a smooth and free-flowing powder, and incorporating the powder into said food material.

References Cited in the file of this patent
UNITED STATES PATENTS
2,875,061    Vogel et al. _____ Feb. 24, 1959

FOREIGN PATENTS
21,553/35    Australia _____ Feb. 27, 1935